(12) United States Patent
Kawabata

(10) Patent No.: US 9,574,543 B2
(45) Date of Patent: Feb. 21, 2017

(54) HYDRAULIC MOTOR

(71) Applicant: KAYABA INDUSTRY CO., LTD., Tokyo (JP)

(72) Inventor: Kaori Kawabata, Kanagawa (JP)

(73) Assignee: KYB Corporation, Tokyo (JP)

( * ) Notice: Subject to any disclaimer, the term of this patent is extended or adjusted under 35 U.S.C. 154(b) by 270 days.

(21) Appl. No.: 14/372,827

(22) PCT Filed: Feb. 14, 2013

(86) PCT No.: PCT/JP2013/053498
§ 371 (c)(1),
(2) Date: Jul. 17, 2014

(87) PCT Pub. No.: WO2013/125433
PCT Pub. Date: Aug. 29, 2013

(65) Prior Publication Data
US 2015/0007556 A1    Jan. 8, 2015

(30) Foreign Application Priority Data
Feb. 22, 2012    (JP) ................................. 2012-036220

(51) Int. Cl.
| F03C 1/00 | (2006.01) |
| F03C 1/40 | (2006.01) |
| F03C 1/06 | (2006.01) |
| F03C 1/34 | (2006.01) |
| F04B 1/20 | (2006.01) |
| B60W 10/103 | (2012.01) |

(52) U.S. Cl.
CPC .......... *F03C 1/0678* (2013.01); *B60W 10/103* (2013.01); *F03C 1/004* (2013.01); *F03C 1/0644* (2013.01); *F03C 1/0655* (2013.01); *F03C 1/0663* (2013.01); *F03C 1/0665* (2013.01); *F03C 1/0697* (2013.01); *F04B 1/2035* (2013.01)

(58) Field of Classification Search
CPC .................................................. F16H 61/4157
USPC ............................................................ 60/436
See application file for complete search history.

(56) References Cited

U.S. PATENT DOCUMENTS

| 6,543,222 B1 * | 4/2003 | Case ....................... B60T 1/065 188/264 F |
| 2012/0024145 A1 | 2/2012 | Mori |

FOREIGN PATENT DOCUMENTS

| EP | 1096143 A1 | 5/2001 |
| JP | 2000-080973 A | 3/2000 |
| JP | 2000-161195 A | 6/2000 |
| JP | 2004-060508 A | 2/2004 |
| JP | 2004-125092 A | 4/2004 |
| JP | 2004125092 A * | 4/2004 |

(Continued)

*Primary Examiner* — Thomas E Lazo
(74) *Attorney, Agent, or Firm* — Rabin & Berdo, P.C.

(57) ABSTRACT

A hydraulic motor includes a motor mechanism that rotates by hydraulic liquid pressure led from a hydraulic liquid pressure source. The hydraulic motor includes a casing that defines a casing chamber which accommodates the motor mechanism, a brake mechanism that brakes the rotation of the motor mechanism, a brake release actuator that releases the braking of the brake mechanism by a brake release pressure led from the hydraulic liquid pressure source, and a throttle passage that is in communication with the casing chamber and extracts a portion of hydraulic liquid that is led into the brake release actuator and leads it to the casing chamber.

3 Claims, 2 Drawing Sheets

(56) References Cited

FOREIGN PATENT DOCUMENTS

| | | |
|---|---|---|
| JP | 2006-161453 A | 6/2006 |
| KR | 10-2011-0119739 A | 11/2011 |
| WO | WO 2009/096100 A1 | 8/2009 |

* cited by examiner

HYDRAULIC MOTOR

TECHNICAL FIELD

The present invention relates to a hydraulic motor that rotates by hydraulic liquid pressure.

BACKGROUND ART

A hydraulic motor that is installed as a travel device in a hydraulic shovel, a road roller, or the like includes a motor mechanism that rotates by hydraulic liquid pressure and a reduction gear that reduces the speed of rotation of the motor mechanism to drive a wheel (drum).

In a piston motor including such a reduction gear, the temperature of the reduction gear rises when continuously operating at high speed, and a casing which accommodates the motor mechanism is also heated due to the rising temperature of the reduction gear.

In the piston motor disclosed in JP2004-60508A, hydraulic oil that has leaked out from the motor mechanism (leak oil) flows into the casing, and the casing is cooled by the hydraulic oil.

In the piston motor disclosed in JP2006-161453A, a portion of the hydraulic oil that drives a capacity-varying mechanism flows into the casing, and the casing is cooled by the hydraulic oil.

SUMMARY OF INVENTION

However, in the piston motor disclosed in JP2004-60508A, the flow amount of leak oil that flows into the casing from the motor mechanism is small. Thus, the cooling of the casing may be insufficient.

In the piston motor disclosed in JP2006-161453A, the hydraulic oil pressure that is led to the capacity-varying mechanism is switched by a speed switching valve (flow amount control valve) that switches the traveling speed. Therefore, when the hydraulic oil pressure is switched to low, the flow amount of hydraulic oil that flows into the casing is reduced, and thus the cooling of the casing may be insufficient.

The present invention was created in consideration of the above-described problems, and an object thereof is to provide a hydraulic motor in which a casing is sufficiently cooled regardless of the operating conditions.

According to one aspect of this invention, a hydraulic motor equipped with a motor mechanism that is configured to rotate by hydraulic liquid pressure led from a hydraulic liquid pressure source, includes: a casing that defines a casing chamber which accommodates the motor mechanism, a brake mechanism that is configured to brake the rotation of the motor mechanism, a brake release actuator that is configured to release the braking of the brake mechanism by a brake release pressure led from the hydraulic liquid pressure source, and a throttle passage that is in communication with the casing chamber and extracts a portion of hydraulic liquid that is led into the brake release actuator and leads it to the casing chamber.

The details as well as other features and advantages of this invention are set forth in the remainder of the specification and are shown in the accompanying drawings.

DESCRIPTION OF EMBODIMENTS

Figure 1:
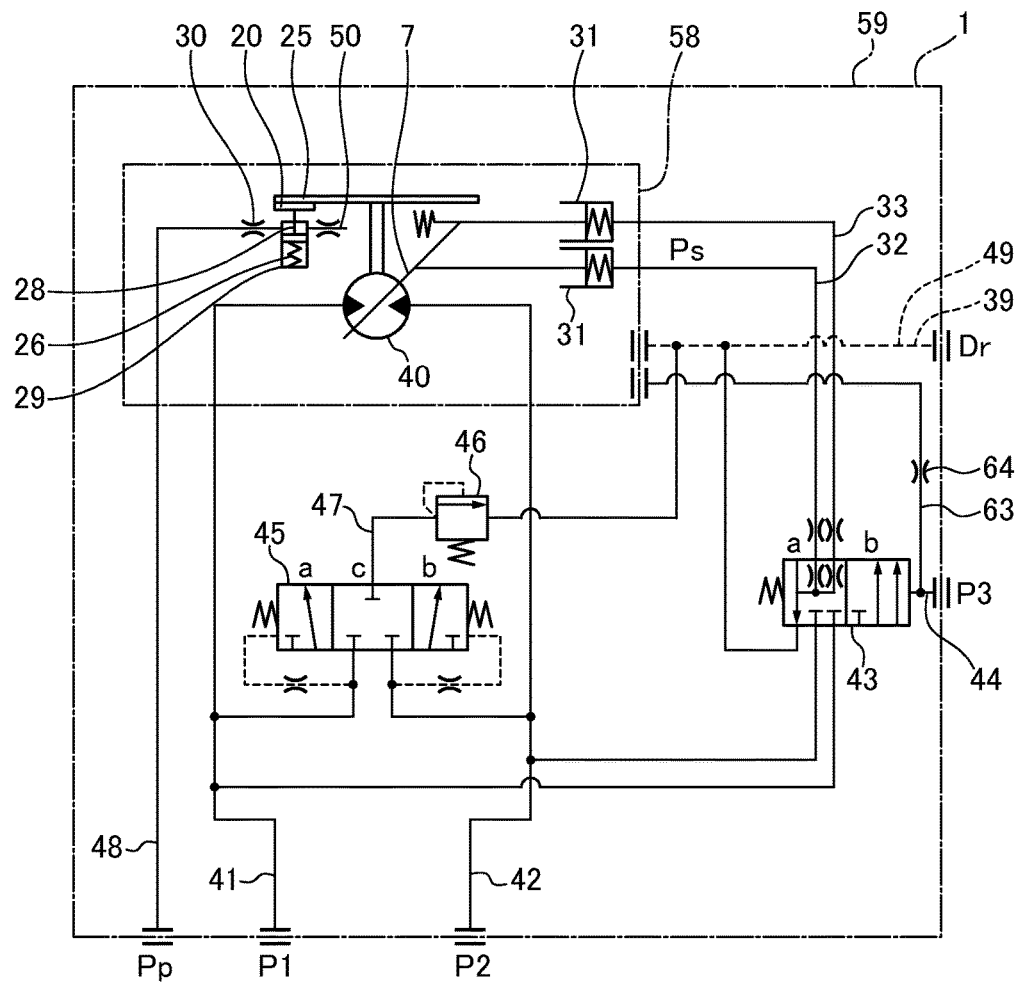
FIG. 1 is an oil pressure circuit diagram of a piston motor illustrating an embodiment of the present invention.

An embodiment of the present invention will now be explained below referring to the drawings.

Figure 2:
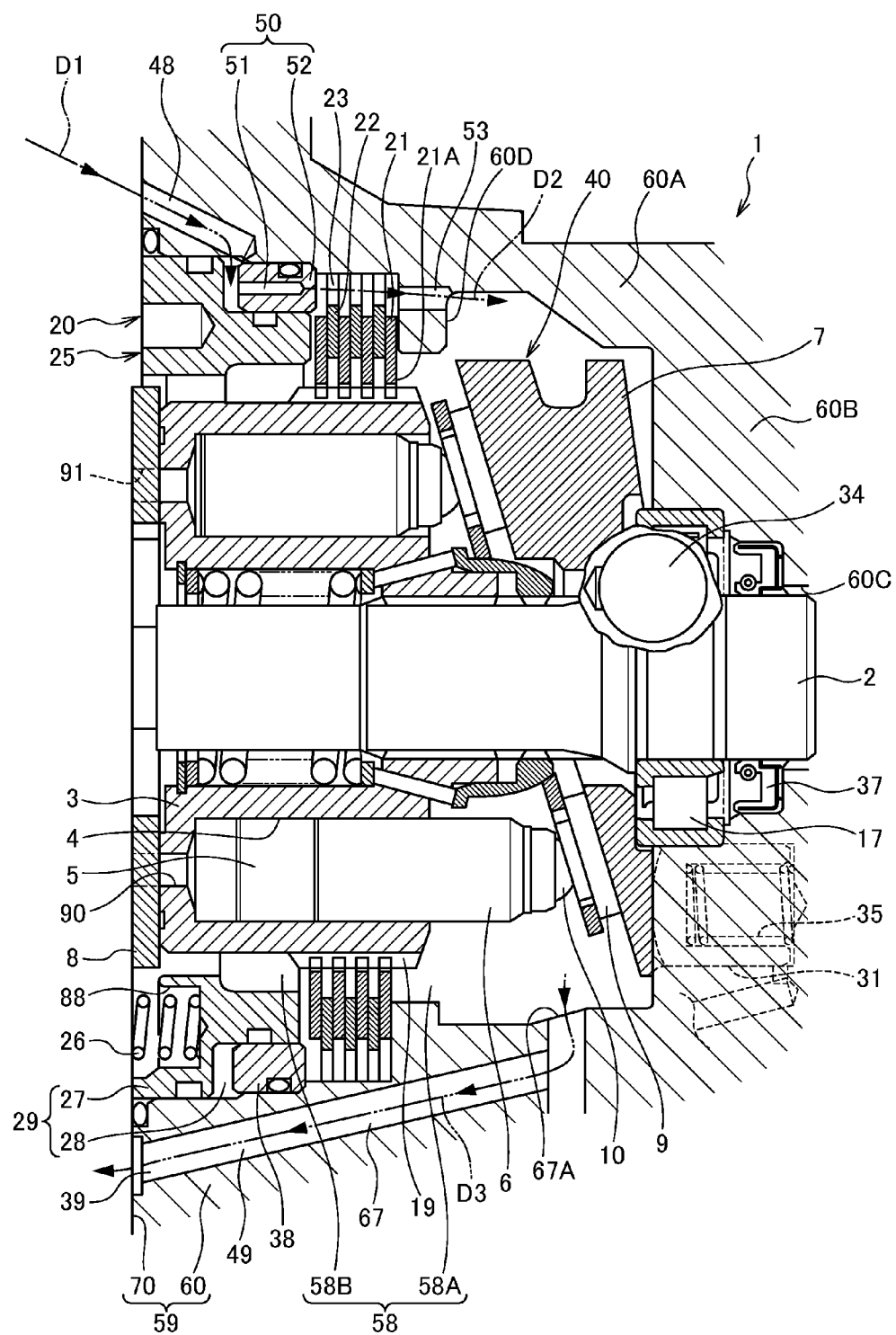
FIG. 2 is a vertical cross-section view of a piston motor.

FIGS. 1 and 2 illustrate a piston motor 1 that constitutes a travel device of a vehicle as one example of a hydraulic motor to which the present invention is applied.

For example, in a road roller, a hydraulic shovel, or the like, a hydrostatic transmission device (HST) is installed to transmit motive power of the engine to the travel device by hydraulic oil pressure. The hydrostatic transmission device includes a variable capacity-type piston pump (not illustrated) as an oil pressure source that is driven by the engine and a variable capacity-type piston motor 1 as a hydraulic motor that drives a wheel. In the hydrostatic transmission device, hydraulic oil circulates between the piston pump and the piston motor 1.

In the piston motor 1, hydraulic oil is used as the hydraulic fluid. Instead of hydraulic oil, for example, a hydraulic liquid such as an aqueous alternative liquid can be used.

FIG. 1 is a diagram of an oil pressure circuit provided in the piston motor 1. As shown in FIG. 1, the piston motor 1 includes a motor mechanism 40 that rotates by hydraulic oil pressure, and first and second motor passages 41 and 42 that supply and discharge hydraulic oil to and from the motor mechanism 40. The first and second motor passages 41 and 42 are connected to an oil pressure source (not illustrated) and constitute a closed circuit of the hydrostatic transmission device.

The piston motor 1 rotates in a counter-clockwise direction when a pressure P1 of hydraulic oil that is led from the oil pressure source to the first motor passage 41 is increased more than a pressure P2 of hydraulic oil that is led to the second motor passage 42.

On the other hand, the piston motor 1 rotates in a clockwise direction when a pressure P2 of hydraulic oil that is led from the oil pressure source to the second motor passage 42 is increased more than a pressure P1 of hydraulic oil that is led to the first motor passage 41.

The piston motor 1 includes a pair of tilting actuators 31 as a capacity-varying mechanism that changes the capacity (displacement volume) of the motor mechanism 40. The tilting actuators 31 operate by hydraulic oil pressure that is led through an actuator passage 32 and an actuator passage 33.

The piston motor 1 includes a speed switching valve 43 that switches the hydraulic oil pressure that is led to the tilting actuators 31. The speed switching valve 43 includes a low speed position a in which the actuator passage 32 and the actuator passage 33 are in communication with an in-motor drain passage 49, and a high speed position b in which the actuator passage 32 and the actuator passage 33 are in respective communication with the first and second motor passages 41 and 42.

Hydraulic oil pressure discharged from a charge pump (not illustrated) provided to the oil pressure source is led to the speed switching valve 43 via a speed switching pilot pressure passage 44. The oil pressure of hydraulic oil that is led via the speed switching pilot pressure passage 44 is a pilot pressure P3 that switches the speed switching valve 43 between the positions a and b.

The charge pump provided to the oil pressure source is driven by the engine.

During operation in which the pilot pressure P3 is low, the speed switching valve 43 is switched to the low speed position a. Thereby, a drain pressure Dr is led to the tilting actuators 31 via the in-motor drain passage 49. If the sum of a propulsive force by the drain pressure Dr and a propulsive force by a two-speed spring 35 (refer to FIG. 2) becomes lower than a propulsive force by a hydraulic pressure of a piston 6 (refer to FIG. 2) that is transmitted through a swash plate 7 (refer to FIG. 2) or the like, the tilting actuators 31 are drawn in. Thus, the capacity of the motor mechanism 40 increases.

During operation in which the pilot pressure P3 rises above a predetermined value, the speed switching valve 43 is switched to the high speed position b. Thereby, motor drive pressures P1 and P2 are respectively led from the first and second motor passages 41 and 42 to the tilting actuators 31. The tilting actuators 31 elongate due to the motor drive pressure P1 or P2. Thus, the tilt angle of the swash plate 7 (refer to FIG. 2) decreases, and the capacity of the motor mechanism 40 decreases.

The piston motor 1 includes a parking brake 20 that automatically brakes the motor mechanism 40 from rotating due to an external force after travel of the vehicle has been stopped. The parking brake 20 includes a brake mechanism 25 that brakes the rotation of the motor mechanism 40 by a biasing force of a brake spring 26 when stopping the rotation of the motor mechanism 40, and a brake release actuator 29 that releases the braking of the brake mechanism 25 when actuating the rotation of the motor mechanism 40.

The brake release actuator 29 operates by a brake release pressure Pp that is led from a brake release pressure passage 48 to a brake release pressure chamber 28. Hydraulic oil pressure that is discharged from the charge pump provided to the oil pressure source is led to the brake release pressure passage 48. The brake release pressure passage 48 is not limited to the above constitution, and it can be constituted such that hydraulic oil that is discharged from a piston pump that constitutes the hydrostatic transmission device provided to the oil pressure source is led to the brake release pressure passage 48. The brake release pressure passage 48 can also be constituted such that a tank pressure and oil pressure from the oil pressure source are selectively led via a switching valve (not illustrated).

A restrictor 30 is interposed in the brake release pressure passage 48. Pressure fluctuations in the brake release pressure chamber 28 are alleviated by the restrictor 30.

When stopping the travel of the vehicle, the brake release pressure Pp that is led to the brake release pressure passage 48 decreases, and the brake mechanism 25 brakes the rotation of the motor mechanism 40 after stopping by the biasing force of the brake spring 26.

On the other hand, when the vehicle is traveling, the brake release pressure Pp is increased, and the brake release actuator 29 operates in a constricting direction to counter the biasing force of the brake spring 26 so that the braking of the brake mechanism 25 is released.

In a casing 59 of the piston motor 1, a casing chamber 58 is provided to accommodate the motor mechanism 40 and the brake mechanism 25.

Hydraulic oil (leak oil) that leaks out from the motor mechanism 40 and the brake release actuator 29 flows into the casing chamber 58. In order to return the hydraulic oil that has leaked out to a tank, a drain passage 39 is provided to connect the casing chamber 58 with the tank. As the drain passage 39, the in-motor drain passage 49 that is formed in the casing 59 and an out-of-motor drain passage (not illustrated) that is connected to the casing 59 are provided.

An oil cooler (not illustrated) that cools the hydraulic oil and an oil filter (not illustrated) that filters the hydraulic oil are interposed in the out-of-motor drain passage. By cooling the hydraulic oil with the oil cooler, the hydraulic oil which is stored in the tank can be maintained at a lower temperature than that of the hydraulic oil that circulates through the first and second motor passages 41 and 42.

In order to cool the hydraulic oil that circulates through the closed circuit connecting the motor mechanism 40 and the oil pressure source, a flushing passage 47 is connected to the first and second motor passages 41 and 42 via a low pressure selective valve 45. A relief valve 46 is interposed in the flushing passage 47.

The low pressure selective valve 45 includes a position a in which the second motor passage 42 is connected to the flushing passage 47, a position b in which the first motor passage 41 is connected to the flushing passage 47, and a position c in which communication between the first and second motor passages 41 and 42 and the flushing passage 47 is blocked. The low pressure selective valve 45 is switched according to a pressure difference of the first and second motor passages 41 and 42.

During normal rotation of the piston motor 1 in which the pressure of the first motor passage 41 rises above the pressure of the second motor passage 42 exceeding a predetermined value, the low pressure selective valve 45 is switched to position a.

On the other hand, during reverse rotation of the piston motor 1 in which the pressure of the second motor passage 42 rises above the pressure of the first motor passage 41 exceeding a predetermined value, the low pressure selective valve 45 is switched to position b.

In this way, a portion of the hydraulic oil that flows through the low-pressure side of the first and second motor passages 41 and 42 is extracted from the flushing passage 47 via the low pressure selective valve 45. The relief valve 46 opens and this hydraulic oil is returned from the flushing passage 47 to the tank through the in-motor drain passage 49 and the out-of-motor drain passage.

Heat is discharged from the hydraulic oil that is returned to the tank through the out-of-motor drain passage by the oil cooler interposed in the out-of-motor drain passage. Thereby, the hydraulic oil that is stored in the tank is maintained at a low temperature.

The oil pressure source (not illustrated) is configured to charge hydraulic oil suctioned from the tank by the charge pump into the closed circuit (the first and second motor passages 41 and 42) of the motor mechanism 40. Thereby, hydraulic oil at a relatively low temperature is replenished from the tank into the first and second motor passages 41 and 42. Thus, temperature increases in the hydraulic oil that circulates through the motor mechanism 40 are suppressed.

In the travel device of the vehicle, a reduction gear is provided adjacent to the casing 59 of the piston motor 1, and the reduction gear reduces the speed of the rotation of the motor mechanism 40 to drive a wheel (drum) (not illustrated). In a travel device installed in a road roller vehicle or the like, if the piston motor 1 is continuously operated to rotate at high speed, the temperature of the reduction gear rises and the casing 59 of the piston motor 1 is heated by the reduction gear. Thus, it is necessary to ensure that a bearing 17 and an oil seal 37 (refer to FIG. 2) interposed in the casing 59 are not overheated.

In contrast, in the present embodiment, a throttle passage 50 is provided to extract a portion of the hydraulic oil that is led from the brake release pressure passage 48 to the brake release actuator 29. The throttle passage 50 is connected to the casing chamber 58 that accommodates the motor mechanism 40 of the piston motor 1, and hydraulic oil that flows out from the throttle passage 50 is led to the casing chamber 58.

Hydraulic oil that flows out from the throttle passage 50 circulates through the casing chamber 58 and absorbs heat of the casing 59 so as to cool the casing 59.

By cooling the casing 59 as described above, the reduction gear that is adjacent to the casing 59 can also be cooled, and thus temperature increases of the reduction gear are suppressed.

When stopping the travel of the vehicle, the brake release pressure Pp that is led from the brake release pressure passage 48 decreases. Therefore, the brake mechanism 25 brakes the rotation of the motor mechanism 40 by the biasing force of the brake spring 26. Further, in accordance with the decrease in the brake release pressure Pp, the flow amount of hydraulic oil that flows out from the throttle passage 50 to the casing chamber 58 decreases. In this case, since the rotation of the motor mechanism 40 is stopped, the reduction gear does not generate heat. Therefore, even if the flow amount of hydraulic oil that flows out from the throttle passage 50 to the casing chamber 58 decreases, the casing 59 and the reduction gear are sufficiently cooled.

On the other hand, when the vehicle is traveling, the brake release pressure Pp that is led from the brake release pressure passage 48 is increased. Thus, the brake release actuator 29 operates to counter the biasing force of the brake spring 26 and the braking by the brake mechanism 25 is released. Further, in accordance with the increase in the brake release pressure Pp, the flow amount of hydraulic oil that flows out from the throttle passage 50 to the casing chamber 58 increases. In this case, since the motor mechanism 40 is rotating, the reduction gear generates heat. However, the flow amount of hydraulic oil that flows out from the throttle passage 50 to the casing chamber 58 increases. Therefore, the casing 59 and the reduction gear are sufficiently cooled, and temperature increases thereof are suppressed.

In this way, the flow amount of hydraulic oil that flows out from the throttle passage 50 to the casing chamber 58 is sufficiently secured in accordance with the operating conditions of the motor mechanism 40. Thus, the casing 59 is sufficiently cooled regardless of the operating conditions of the piston motor 1.

The piston motor 1 includes a branched passage 63 that connects the speed switching pilot pressure passage 44 and the casing chamber 58. Hydraulic oil that is led from the speed switching pilot pressure passage 44 is led to the casing chamber 58 through the branched passage 63. A restrictor 64 is interposed in the branched passage 63, and the flow amount of hydraulic oil that is led to the casing chamber 58 through the branched passage 63 is adjusted.

Hydraulic oil of the pilot pressure P3 that is discharged from the charge pump (not illustrated) provided to the oil pressure source is led to the speed switching pilot pressure passage 44. The speed switching valve 43 is switched between the positions a and b in accordance with the level of the pilot pressure P3. Further, hydraulic oil that is supplied to the speed switching pilot pressure passage 44 circulates through the casing chamber 58 via the branched passage 63. Thereby, heat of the casing 59 is absorbed and the casing 59 is cooled.

Hereinafter, the specific constitution of the piston motor 1 will be explained referring to FIG. 2. FIG. 2 is a vertical cross-section view of the piston motor 1. As shown in FIG. 2, the piston motor 1 includes a case 60 and a base plate 70 as the casing 59. The casing chamber 58 is defined between the case 60 and the base plate 70. The motor mechanism 40 and the brake mechanism 25 are accommodated in the casing chamber 58.

In the piston motor 1, one end of an output shaft 2 is rotatably supported on the case 60 via a bearing 17, and the other end of the output shaft 2 is rotatably supported on the base plate 70 via a bearing (not illustrated).

The case 60 includes a cylinder-shaped case side part 60A and a disc-shaped case bottom part 60B. A case opening part 60C is formed at the center of the case bottom part 60B. One end of the output shaft 2 faces the case opening part 60C. An input shaft of the reduction gear is connected to one end of the output shaft 2 so that the motive power of the output shaft 2 is extracted. The oil seal 37 is interposed between the case opening part 60C and the output shaft 2. The casing chamber 58 is sealed by the oil seal 37.

The motor mechanism 40 includes the output shaft 2 and a cylinder block 3 that rotates integrally with the output shaft 2. A plurality of cylinders 4 are formed on the cylinder block 3. The cylinders 4 extend parallel to the output shaft 2, and are arranged approximately concyclically centered on the output shaft 2. A piston 6 is inserted into each cylinder 4, and a volume chamber 5 is defined between each cylinder 4 and piston 6.

A shoe 9 is movably connected via a spherical seat 10 to the tip of each piston 6. In accordance with the rotation of the cylinder block 3, each shoe 9 slidingly contacts the swash plate 7, and each piston 6 moves back and forth in a stroke amount according to a tilt angle of the swash plate 7.

A valve plate 8 is interposed between the case 60 and the base plate 70. The valve plate 8 includes two ports 91 that are in communication with the oil pressure source (not illustrated). A port 90 that is in communication with each volume chamber 5 opens to an end surface of the cylinder block 3. The pistons 6 protrude from the cylinders 4 by hydraulic oil pressure led from the oil pressure source to the volume chambers 5 through the ports 91 and 90, and the pistons 6 push the swash plate 7 via the shoes 9 to rotate the cylinder block 3.

A pair of balls (support shafts) 34 that tiltingly support the swash plate 7 at the center of a tilting axis and a pair of tilting actuators 31 that compress the back surface side of the swash plate 7 are provided on the case bottom part 60B.

When a pilot pressure Ps that is led to the tilting actuators 31 is low, the swash plate 7 is retained in a heavily tilted position (state shown in FIG. 2) by the resultant force of a compressing force generated from the pistons 6. When the swash plate 7 is in the heavily tilted position, the stroke amount of the pistons 6 increases. Thus, the output shaft 2 rotates at a low speed with a high torque.

If one of the pilot pressure Ps that is led to the tilting actuators 31 is increased, the swash plate 7 is tilted due to compression by the tilting actuators 31 and is switched to a slightly tilted position. When the swash plate 7 is in the slightly tilted position, the stroke amount of the pistons 6 decreases. Thus, the output shaft 2 rotates at a high speed with a low torque.

The first and second motor passages 41 and 42, the speed switching valve 43, the low pressure selective valve 45, the relief valve 46, the flushing passage 47, and the brake release pressure passage 48 shown in FIG. 1 are provided on the base plate 70.

The brake mechanism 25 of the parking brake 20 includes four brake discs 21 that rotate together with the cylinder block 3, three friction plates 22 that are attached to the case 60, and the brake spring 26 that compresses the brake discs 21 to the friction plates 22.

The annular disc-shaped brake discs 21 are formed such that a plurality of teeth 21A are aligned in the circumferential direction on the inner peripheral edges of the brake discs 21. A spline 19 that extends in the axial direction is formed on the outer periphery of the cylinder block 3. The brake discs 21 rotate together with the cylinder block 3 by the engagement of the teeth 21A with the spline 19, and the brake discs 21 are movably supported in the rotation axis direction of the cylinder block 3.

An annular brake disc receiving flange 60D that abuts the brake discs 21 is formed on an inner wall of the case 60. The brake discs 21 are imparted with a reactive force by abutting the brake disc receiving flange 60D, and the brake discs 21 are locked from moving in the rotation axis direction of the cylinder block 3. The brake disc receiving flange 60D can be formed separately from the case 60.

As explained above, the brake release actuator 29 releases the braking of the brake mechanism 25 to counter the compressive force of the brake spring 26. The brake release actuator 29 includes an annular brake piston 27 that is movably supported in the axial direction on the case 60, and the brake release pressure chamber 28 to which the brake release pressure Pp that drives the brake piston 27 to counter the brake spring 26 is led. A plurality of spring receiving recesses 88 in which the brake spring 26 is seated are formed on an end surface of the brake piston 27.

A collar 38 is attached to an inner wall of the case side part 60A. The brake piston 27 is slidably engaged into the inside of the collar 38. The collar 38 slidably supports the brake piston 27 on the case 60 and defines the brake release pressure chamber 28.

The brake release pressure chamber 28 is defined as an annular space between the brake piston 27 and the collar 38. Hydraulic oil of the brake release pressure Pp is led from the brake release pressure passage 48 to the brake release pressure chamber 28 as shown by a flow line (dash-dot-dot line) D1.

When stopping the travel of the vehicle, the brake discs 21 are pressed to the friction plates 22 by the biasing force of the brake spring 26 in a state in which the brake release pressure Pp that is led to the brake release pressure chamber 28 has decreased. Thereby, the rotation of the cylinder block 3 is braked by a frictional force acting on the brake discs 21.

On the other hand, when the vehicle is traveling, in accordance with an increase in the brake release pressure Pp, the brake piston 27 separates from the brake discs 21 to counter the biasing force of the brake spring 26 and the brake discs 21 separate from the friction plates 22. Thereby, the frictional force stops acting on the brake discs 21, and the braking of the cylinder block 3 is released.

The casing chamber 58 is partitioned into a swash plate housing chamber 58A and an actuator housing chamber 58B by the brake discs 21 and the friction plates 22 of the brake mechanism 25.

A through hole 51 and a restricting hole 52 that penetrate through the collar 38 are formed on the collar 38 as the throttle passage 50 that extracts a portion of the hydraulic oil that is led from the brake release pressure passage 48 to the brake release actuator 29.

One end of the through hole 51 opens into the brake release pressure chamber 28 as an inlet of the throttle passage 50. The other end of the through hole 51 is in communication with one end of the restricting hole 52. The other end of the restricting hole 52 opens into the actuator housing chamber 58B as an outlet of the throttle passage 50.

The through hole 51 and the restricting hole 52 extend approximately in parallel to the output shaft 2 of the cylinder block 3. The restricting hole 52 opens facing a gap 23 provided between the inner wall surface of the case 60 and the outer peripheral ends of the friction plates 22. Hydraulic oil that flows out from the restricting hole 52 to the casing chamber 58 is directed toward the gap 23.

A flange through hole 53 is formed to penetrate through the brake disc receiving flange 60D of the case 60. The flange through hole 53 extends approximately in parallel to the rotation axis of the cylinder block 3, and is arranged on an extension line of the restricting hole 52. The flange through hole 53 faces the restricting hole 52 with the brake discs 21 therebetween.

Thereby, hydraulic oil that flows out from the restricting hole 52 to the casing chamber 58 is led to the swash plate housing chamber 58A through the gap 23 and the flange through hole 53 as shown by a flow line (dash-dot-dot line) D2. Hydraulic oil that flows into the swash plate housing chamber 58A in this way flows along the swash plate 7, an inner wall surface of the case bottom part 60B, and the bearing 17. Therefore, the case bottom part 60B and the bearing 17 are effectively cooled.

As described above, hydraulic oil in the casing chamber 58 is returned to the tank via the in-motor drain passage 49 and the out-of-motor drain passage.

The in-motor drain passage 49 is defined by a drain through hole 67 that is formed in the case side part 60A. Hydraulic oil in the casing chamber 58 flows out through the in-motor drain passage 49 as shown by a flow line (dash-dot-dot line) D3.

An inlet 67A, which is an opened end of the drain through hole 67, opens to an inner wall surface of the case side part 60A. The inlet 67A opens into the swash plate housing chamber 58A which houses the swash plate 7, and is formed at a position facing the flange through hole 53 with the swash plate 7 therebetween.

In this way, hydraulic oil in the casing chamber 58 that heads from the flange through hole 53 to the drain through hole 67 passes through the swash plate housing chamber 58A which houses the swash plate 7 and does not cross the brake discs 21 and the friction plates 22 of the brake mechanism 25. Therefore, resistance on the hydraulic oil by the rotating brake discs 21 is suppressed, and the flow amount of hydraulic oil that circulates through the casing chamber 58 is sufficient.

According to the above-described embodiment, the following operational effects are achieved.

The piston motor 1 includes the casing 59 that defines the casing chamber 58 which accommodates the motor mechanism 40, the brake mechanism 25 that brakes the rotation of the motor mechanism 40, the brake release actuator 29 that releases the braking of the brake mechanism 25 by the brake release pressure Pp that is led from a hydraulic liquid pressure source, and the throttle passage 50 that is in communication with the casing chamber 58 and extracts a portion of the hydraulic liquid that is led to the brake release actuator 29 and leads it to the casing chamber 58.

According to the above-described constitution, hydraulic liquid that flows out from the throttle passage 50 circulates through the casing chamber 58 to absorb heat of the casing 59, and thereby the casing 59 is cooled. When the motor mechanism 40 is rotating, during which braking of the motor mechanism 40 by the brake mechanism 25 is released, the brake release pressure Pp that is led to the brake release actuator 29 is increased compared to when the rotation of the motor mechanism 40 is stopped, during which the rotation of the motor mechanism 40 is braked by the brake mechanism 25. Therefore, the flow amount of hydraulic liquid that flows out from the throttle passage 50 into the casing chamber 58 increases.

In this way, when the motor mechanism 40 is rotating, in accordance with a release of braking by the brake mechanism 25, the flow amount of hydraulic liquid that flows out from the throttle passage 50 into the casing chamber 58 increases. Thus, the casing 59 is sufficiently cooled regardless of the operating conditions.

The motor mechanism 40 includes the swash plate 7 provided within the casing chamber 58, a plurality of pistons 6 that move back and forth following the swash plate 7 by hydraulic liquid pressure, the cylinder block 3 that rotates relative to the swash plate 7 by the back-and-forth motion of the pistons 6, and the output shaft 2 that outputs the rotation of the cylinder block 3. The brake mechanism 25 includes the brake discs 21 that rotate together with the cylinder block 3, the friction plates 22 that are attached to the casing 59, and the brake spring 26 that compresses the brake discs 21 to the friction plates 22. The brake release actuator 29 includes the annular brake piston 27 that is movably supported in the rotation axis direction of the cylinder block 3 on the casing 59, and the brake release pressure chamber 28 to which the brake release pressure Pp that drives the brake piston 27 to counter the brake spring 26 is led. The throttle passage 50 connects the brake release pressure chamber 28 and the casing chamber 58 to each other.

According to the above-described constitution, in the piston motor 1, hydraulic liquid in the brake release pressure chamber 28 flows through the throttle passage 50 into the casing chamber 58. The hydraulic liquid circulates through the casing chamber 58 to absorb heat of the casing 59, and thereby the casing 59 is cooled. When the motor mechanism 40 is rotating, during which braking of the motor mechanism 40 by the brake mechanism 25 is released, the brake release pressure Pp that is led to the brake release actuator 29 is increased compared to when the rotation of the motor mechanism 40 is stopped, during which the rotation of the motor mechanism 40 is braked by the brake mechanism 25. Therefore, the flow amount of hydraulic liquid that flows out from the throttle passage 50 into the casing chamber 58 increases.

The casing chamber 58 is partitioned by the brake discs 21 into the actuator housing chamber 58B which houses the brake release actuator 29 and the swash plate housing chamber 58A which houses the swash plate 7. The outlet of the throttle passage 50 opens into the actuator housing chamber 58B. The inlet 67A of the drain passage 39 that discharges hydraulic liquid of the casing chamber 58 opens into the swash plate housing chamber 58A.

According to the above-described constitution, hydraulic liquid that flows out from the outlet of the throttle passage 50 and into the actuator housing chamber 58B crosses the brake discs 21 and enters the swash plate housing chamber 58A, and then flows out from the swash plate housing chamber 58A through the drain passage 39. Thereby, the flow amount of hydraulic liquid that circulates through the swash plate housing chamber 58A is sufficient. Therefore, the case bottom part 60B that is heated by the reduction gear is reliably cooled.

The piston motor 1 also includes the collar 38 that slidingly supports the brake piston 27 on the casing 59. The throttle passage 50 is defined by the restricting hole 52 that penetrates through the collar 38.

According to the above-described constitution, hydraulic liquid in the brake release pressure chamber 28 flows into the casing chamber 58 through the restricting hole 52 of the collar 38, and thereby the casing 59 is cooled. Since the throttle passage 50 is provided by forming a restricting hole 52 in the existing collar 38, an increase in the complexity of the piston motor 1 structure due to the throttle passage 50 can be avoided.

The present invention is not limited to the above constitution, and the collar 38 can be formed integrally with the case 60 and the throttle passage 50 can be formed on the casing 59.

The casing 59 includes the brake disc receiving flange 60D that receives the brake discs 21 and the flange through hole 53 that penetrates through the brake disc receiving flange 60D and is disposed facing the restricting hole 52 with the brake discs 21 therebetween.

According to the above-described constitution, hydraulic liquid in the brake release pressure chamber 28 flows into the casing chamber 58 through the restricting hole 52 of the collar 38. The hydraulic liquid is led to the back side (the swash plate housing chamber 58A) of the casing chamber 58 through the gap between the brake discs 21 and the casing 59 and the flange through hole 53, and thus the casing 59 is cooled. Thereby, the casing chamber 58 is partitioned by the brake discs 21 and pressure increases in the actuator housing chamber 58B in which the brake release actuator 29 is provided are suppressed. Therefore, the operability of the brake release actuator 29 is ensured.

Embodiments of this invention were described above, but the above embodiments are merely examples of applications of this invention, and the technical scope of this invention is not limited to the specific constitutions of the above embodiments.

This application claims priority based on Japanese Patent Application No. 2012-036220 filed with the Japan Patent Office on Feb. 22, 2012, the entire contents of which are incorporated into this specification.

The invention claimed is:
1. A hydraulic motor, comprising:
a casing that defines a casing chamber which accommodates the motor mechanism;
a motor mechanism that is configured to rotate by hydraulic liquid pressure led from a hydraulic liquid pressure source, the motor mechanism including
 a swash plate,
 a plurality of pistons that are configured to move back and forth following the swash plate by hydraulic liquid pressure,
 a cylinder block that is configured to rotate relative to the swash plate by the back-and-forth motion of the pistons, and
 an output shaft that is configured to output the rotation of the cylinder block;
a brake mechanism that is configured to brake the rotation of the motor mechanism, the brake mechanism including
 a brake disc that is configured to rotate together with the cylinder block, the casing chamber being partitioned by the brake disc into an actuator housing chamber which houses the brake release actuator and a swash plate housing chamber which houses the swash plate,
 a friction plate that is attached to the casing, and
 a brake spring that is configured to compress the brake disc to the friction plate;

a brake release actuator that is configured to release the braking of the brake mechanism by a brake release pressure led from the hydraulic liquid pressure source, the brake release actuator including
- an annular brake piston that is movably supported on the casing in a rotation axis direction of the cylinder block, and
- a brake release pressure chamber into which a brake release pressure that drives the brake piston to counter the brake spring is led;

a throttle passage that is in communication with the casing chamber and extracts a portion of hydraulic liquid that is led into the brake release actuator and leads it to the casing chamber, the throttle passage connecting the brake release pressure chamber and the casing chamber, an outlet of the throttle passage opening into the actuator housing chamber; and a drain passage that is configured to discharge hydraulic liquid of the casing chamber, and inlet of the drain passage opening into the swash plate housing chamber.

2. A hydraulic motor, comprising:

a casing that defines a casing chamber which accommodates the motor mechanism;

a motor mechanism that is configured to rotate by hydraulic liquid pressure led from a hydraulic liquid pressure source, the motor mechanism including
- a swash plate,
- a plurality of pistons that are configured to move back and forth following the swash plate by hydraulic liquid pressure,
- a cylinder block that is configured to rotate relative to the swash plate by the back-and-forth motion of the pistons, and
- an output shaft that is configured to output the rotation of the cylinder block;

a brake mechanism that is configured to brake the rotation of the motor mechanism, the brake mechanism including
- a brake disc that is configured to rotate together with the cylinder block,
- a friction plate that is attached to the casing, and
- a brake spring that is configured to compress the brake disc to the friction plate;

a brake release actuator that is configured to release the braking of the brake mechanism by a brake release pressure led from the hydraulic liquid pressure source, the brake release actuator including
- an annular brake piston that is movably supported on the casing in a rotation axis direction of the cylinder block, and
- a brake release pressure chamber into which a brake release pressure that drives the brake piston to the counter the brake spring is led;

a throttle passage that is in communication with the casing chamber and extracts a portion of hydraulic liquid that is led into the brake release actuator and leads it to the casing chamber, the throttle passage connecting the brake release pressure chamber and the casing chamber; and a collar that slidingly supports the brake piston on the casing, the throttle passage being defined by a restricting hole that penetrates through the collar.

3. The hydraulic motor according to claim 2, wherein the casing includes:
- a brake disc receiving flange that receives the brake disc, and
- a flange through hole that penetrates through the brake disc receiving flange and is disposed facing the restricting hole with the brake disc therebetween.

* * * * *